(12) United States Patent
Bekampis et al.

(10) Patent No.: US 10,797,902 B2
(45) Date of Patent: Oct. 6, 2020

(54) CONTROL OF NETWORK-CONNECTED DEVICES IN ACCORDANCE WITH GROUP PREFERENCES

(71) Applicant: AT&T Intellectual Property I, L.P., Atlanta, GA (US)

(72) Inventors: Jessica Bekampis, Wayside, NJ (US); Roque Rios, III, Middletown, NJ (US); Thomas Grodner, Lakewood, NJ (US); Karen Rovner, Howell, NJ (US); Carolyn Bekampis, Wayside, NJ (US); Elissa Backas, Sayreville, NJ (US); Terry Troutman, Tinton Falls, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/226,371

(22) Filed: Dec. 19, 2018

(65) Prior Publication Data
US 2020/0204390 A1 Jun. 25, 2020

(51) Int. Cl.
*H04L 12/28* (2006.01)
*H04N 21/45* (2011.01)
(Continued)

(52) U.S. Cl.
CPC ........ *H04L 12/2814* (2013.01); *H04L 12/282* (2013.01); *H04L 67/306* (2013.01);
(Continued)

(58) Field of Classification Search
CPC . H04L 12/2814; H04L 67/306; H04L 12/282; H04N 21/44218; H04N 21/4532
See application file for complete search history.

(56) References Cited

U.S. PATENT DOCUMENTS

| 5,446,891 A | 8/1995 | Kaplan et al. |
| 9,009,088 B2 | 4/2015 | Wilson et al. |

(Continued)

FOREIGN PATENT DOCUMENTS

| WO | 20170153308 A1 | 9/2017 |
| WO | 20180093661 A1 | 5/2018 |

(Continued)

OTHER PUBLICATIONS

Mozer, Michael C. "The Neural Network House: An Environment that Adapts to its Inhabitants," Proc. AAAI Spring Symp, Intelligent Environments, vol. 58, 1998, pp. 110-114.
(Continued)

*Primary Examiner* — Stella L. Woo (57) ABSTRACT

A processing system including at least one processor may detect the presence of at least two users in a zone containing a network-connected device, obtain preferences and tolerance ranges of the at least two users with respect to the network-connected device, select a setting for the network-connected device in accordance with the preferences and tolerance ranges of the at least two users, and apply the setting to the network-connected device. The processing system may further detect a change of the setting, and adjust at least one of the preferences and tolerance ranges of the at least two users in response to the change of the setting.

20 Claims, 3 Drawing Sheets

(51) Int. Cl.
*H04N 21/442* (2011.01)
*H04L 29/08* (2006.01)
*G06N 20/00* (2019.01)

(52) U.S. Cl.
CPC ... *H04N 21/44218* (2013.01); *H04N 21/4532* (2013.01); *G06N 20/00* (2019.01)

(56) References Cited

U.S. PATENT DOCUMENTS

| | | | |
|---|---|---|---|
| 9,020,647 B2 | 4/2015 | Johnson et al. | |
| 9,526,860 B2 | 12/2016 | Baaijens et al. | |
| 2010/0204807 A1 | 8/2010 | Isaacson | |
| 2012/0158203 A1* | 6/2012 | Feldstein | G06F 1/3231 700/295 |
| 2012/0316687 A1* | 12/2012 | Chen | H02J 3/008 700/276 |
| 2015/0057839 A1* | 2/2015 | Chang | B60R 16/037 701/2 |
| 2016/0104486 A1* | 4/2016 | Penilla | H04L 67/12 704/232 |
| 2016/0131383 A1 | 5/2016 | Zhao et al. | |
| 2016/0223405 A1 | 8/2016 | Zinger et al. | |
| 2016/0231718 A1 | 8/2016 | Logan et al. | |
| 2018/0190379 A1 | 7/2018 | Desai et al. | |
| 2018/0211333 A1 | 7/2018 | Lackman et al. | |
| 2018/0213284 A1 | 7/2018 | Shekhar et al. | |
| 2018/0248972 A1 | 8/2018 | Ahuja | |
| 2018/0359477 A1* | 12/2018 | Yang | H04N 19/136 |
| 2019/0090329 A1* | 3/2019 | Chraibi | H05B 37/0227 |
| 2019/0188378 A1* | 6/2019 | Eltoft | G06N 20/00 |
| 2019/0214954 A1* | 7/2019 | Coover | H04R 3/00 |
| 2020/0053312 A1* | 2/2020 | Mukherjee | G05B 13/0265 |

FOREIGN PATENT DOCUMENTS

| | | |
|---|---|---|
| WO | 20180094375 A1 | 5/2018 |
| WO | 20180141061 A1 | 8/2018 |

OTHER PUBLICATIONS

Hagras, H., et al., "A Hierarchical Fuzzy-Genetic Multi-Agent Architecture for Intelligent Buildings Learning, Adaptation and Control," Journal of Information Sciences, vol. 150, pp. 33-54, Mar. 2003.

Das, Sajal K. et al., "The Role of Prediction Algorithms in the MavHome Smart Home Architecture," IEEE Wireless Communications 9.6, Dec. 2002, pp. 77-84.

Makonin, Stephen et al., "A Smarter Smart Home: Case Studies of Ambient Intelligence," IEEE Pervasive Computing, vol. 12, Issue 1, Jan.-Mar. 2013, pp. 58-66.

* cited by examiner

CONTROL OF NETWORK-CONNECTED DEVICES IN ACCORDANCE WITH GROUP PREFERENCES

The present disclosure relates to network-connected devices (e.g., Internet of Things (IoT) devices), and more particularly to devices, non-transitory computer-readable media, and methods for applying a setting to a network-connected device in accordance with preferences and tolerance ranges of at least two users.

BACKGROUND

Some devices may enable users to create and switch between unique profiles with specific preferences, e.g., computer desktop settings or other user account settings. However, these types of user preferences may be carefully self-curated and the value of these individualized profiles may fall apart when multiple users are in play.

SUMMARY

Devices, computer-readable media, and methods for applying a setting to a network-connected device in accordance with preferences and tolerance ranges of at least two users are disclosed. For example, a processing system including at least one processor may detect a presence of at least two users in a zone containing a network-connected device, obtain preferences and tolerance ranges of the at least two users with respect to the network-connected device, select a setting for the network-connected device in accordance with the preferences and tolerance ranges of the at least two users, and apply the setting to the network-connected device. The processing system may further detect a change of the setting, and adjust at least one of the preferences and tolerance ranges of the at least two users in response to the change of the setting.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Devices, computer-readable media and methods for applying a setting to a network-connected device in accordance with preferences and tolerance ranges of at least two users are disclosed. For instance, the present disclosure tailors digital/technological environments to users' needs and desires for particular activities with respect to network-connected/Internet of Things (IoT) devices via machine learning (ML). In one example, devices and sensors are deployed to blend multiple users' learned unique personal preferences (volume, brightness, content, etc.) and their ambient environments (light levels, temperature, noise, etc.) to optimize the user and multi-user experiences when engaging in various activities such as watching television, playing board games, eating dinner, and so forth. For a gathering of multiple guests, e.g., in a media room of a user's home, it may be possible for the user to construct a "general audience" or "default group" profile for when the user intends to entertain multiple other users. However, this may not provide the most optimal viewing experience for that particular group of individuals. Taking into account their preferences and the ambient environment, it is merely a bare minimum standard.

The present disclosure automatically detects and learns specific user sensitivities to controllable (digital/smart) environmental factors and then employs the preferences and tolerances of various users to propose and implement a set of optimal settings for network-connected devices in view of such information. In one example, the present disclosure leverages machine learning in a network of IoT devices while adhering to accepted scientific standards for optimal environments for particular activities (e.g., light temperatures that are objectively best for average human eyes for reading, versus discussion, versus television viewing, and so forth).

In one example, the present disclosure comprises a network/cloud-based processing system that observes and models each user individually with reinforcement learning, e.g., a machine learning model (MLM). In one example, user profiles are stored/encoded in a hierarchical temporal memory (HTM) and the processing system may "learn" each user's specific preferences and tolerance ranges for different settings of controllable, network-connected devices. For instance, the processing system may observe users manually adjusting light settings, temperature settings, volume settings, and so on with respect to different rooms or other locations, different activities, different times of day, different seasons, etc. The processing system may then identify a preferred device setting and calculate a tolerance range for each available device setting with respect to various factors, such as other available devices, device settings, activities, locations, rooms, and/or time aspects (these may be considered the features of the model). To illustrate, a "state" may comprise any combination of available devices, device settings, activity, location, room, and/or time aspects, and the machine learning model attempts to predict the best policy for each state for the user. A tolerance range measures what may not be ideal for a user but which may still acceptable to the user. Notably, some users may be more flexible than others. Easygoing users may have a wider tolerance range than those who are finicky (e.g., a user who may adjust the temperature of a room by one degree, for instance, in order to be comfortable).

Once individual user models are trained, the processing system may self-test for accuracy. For example, the processing system may observe and detect whether the predicted device/setting adjustments for activity X hold true when the user comes into a room and engages in activity X. Thus, the present disclosure predicts a user's preferences, auto-adjusts one or more device settings to account for the preferences, and refines and updates the user's predicted preferences as the processing system observes the user's reactions to the environment having device settings predicted to be optimal for the given available device(s), settings, activity, location, room, and/or time aspects (the given "state"). The user's reactions may include manually changing one or more device settings (e.g., changing a temperature, a light level, a volume, a brightness, a type of content, station, channel, or the like, and so forth), or may include a biometric reaction, e.g., a mood detected via one or more biometric signals or inputs, such as facial imagery, heart rate data, and so on. For example, manually changing a temperature setting may be indicative that the predicted temperature setting was not correct for this particular user. Similarly, the user making faces indicative of discomfort or unhappiness may also be indicative that one or more of the device settings is not ideal for this user.

Next, with accurate models of many individuals, the present disclosure may sense when a group of two or more users is present in a "zone" (e.g., a room or other area where users may be considered proximate and where the environment, and the users' experiences of the environment may be influenced by the control of one or more settings of one or more network-connected devices in the zone). The presence of the users may be detected via mobile device identification, e.g., smartphones, radio frequency identification (RFID) tags, or the like, facial image recognition, events/ activities scheduled in a digital calendar or calendars of one or several users, and so on. The present disclosure may then combine the users' unique preferences, while adhering to mandated or generally accepted safety ranges, and/or generally accepted statistics or scientific facts regarding human preferences and tolerances, to create an "optimal" experience for the particular group of users.

In one example, the present disclosure may skew an "average" of the users' preferred settings in favor of those users who are more finicky over those who are more easygoing in order to produce an environment with as few complaints as possible. In other words, a setting may be calculated from a weighted average, with greater weight being placed upon the preferences and tolerance ranges of users with narrower tolerance ranges, and lesser weight being placed upon the preferences and tolerance ranges of users with broader tolerance ranges. In addition, in one example, the group itself, identified as a unique combination of modeled individuals, may also be quantified via a machine learning model in a similar manner to the individual users. In other words, the present disclosure may maintain a group model, or group profile.

It should be noted that a group composed of user A, B, and C doing activity X may have group preferences and/or tolerances ranges that are entirely different than the average, or a weighted average of the preferences and/or tolerance ranges of users A, B, and C doing activity X individually, e.g., in each of their respective homes. For instance, the group model may account for a current state, e.g., with available device(s), settings, activity, location, room, and/or time aspects as features. Following a similar methodology to the individual model, the group model may be trained, tested, and re-tuned through multiple cycles of deploying device settings, observing user reactions, and adjusting the predicted optimal device settings based upon the users' reactions.

Another way to describe the multi-user case is: a state may comprise any combination of a set of individual users, device(s), device setting(s), activity, room, location, and time factors, and the group model attempts to predict the best policy (settings of one or more controllable network-connected devices) for each state. In one example, the group model may be similarly stored/encoded in a hierarchical temporal memory (HTM), and the preferences and/or tolerance ranges of the group learned and refined over time and over multiple observations of the users' behaviors. In addition, in one example, the group model and the individual models may be stored/encoded in a same hierarchical temporal memory (HTM) structure. For instance, the models for individual users may comprise lower layers of the HTM structure, while the group model (and various other group models for different groups/combinations of users) may comprise higher layer(s) of the HTM structure. The outputs of individual user models may comprise inputs to the group models. In addition, the other factors of a "state" which comprise inputs to the individual models may also comprise direct inputs to the layers comprising the group models (e.g., available device(s), settings, activity, location, room, and/or time aspects).

It should be noted that the present disclosure may learn both the group's preferences as well as the individuals' preferences. For example, the fact that a user does not adjust a device setting may indicate that the current setting is within a user's tolerance range. However, the user's tolerance range may be greater when in a group, or when in a particular group, compared to when the user is alone. In addition, users may be more or less flexible when in certain groups, such that user A may be flexible when in a first group (e.g., a work group) but may be more picky when in a second group (e.g., a family group). Thus, each group model may result in different group preferences in accordance with the individual group constituents as well as the particular group dynamics, the type of activity associated with the group, and so forth.

Although user and group profiles/models may be stored/ encoded and learned via a hierarchical temporal memory (HTM) structure, in other, further, and different examples various types of machine learning (ML) models may be employed. As referred to herein, a machine learning model (MLM) (or machine learning-based model) may comprise a machine learning algorithm (MLA) that has been "trained" or configured in accordance with input data (e.g., training data) to perform a particular service, e.g., to detect a type of object, such as a face, in images and/or video content, to detect speech or other sounds in audio content, to output a set of one or more device settings, given an input "state," and so forth. Examples of the present disclosure are not limited to any particular type of MLA/model, but are broadly applicable to various types of MLAs/models that utilize training data, such as deep learning algorithms/ models, such as deep neural networks (DNNs), decision tree algorithms/models, and so forth, and which may accept "state" information as inputs and output a set of one or more network-connected device settings (e.g., in accordance with individual user and/or group preferences and tolerance ranges).

In addition, an individual may always retain the rights to his or her profile. In other words, even though system learns, the user may force the system to honor preferences as input by user. Similarly, a user may cause his or her profile to be reset, deleted, or prevented from evolving through learning. In other words, the profile can be forced to remain as manually configured by the user. In one example, a user can opt out of data collection for learning of preferences and tolerance ranges but may still broadcast preferences and tolerance ranges for implementation. These and other aspects of the present disclosure are discussed in greater detail below in connection with the examples of FIGS. 1-3.

Figure 1:
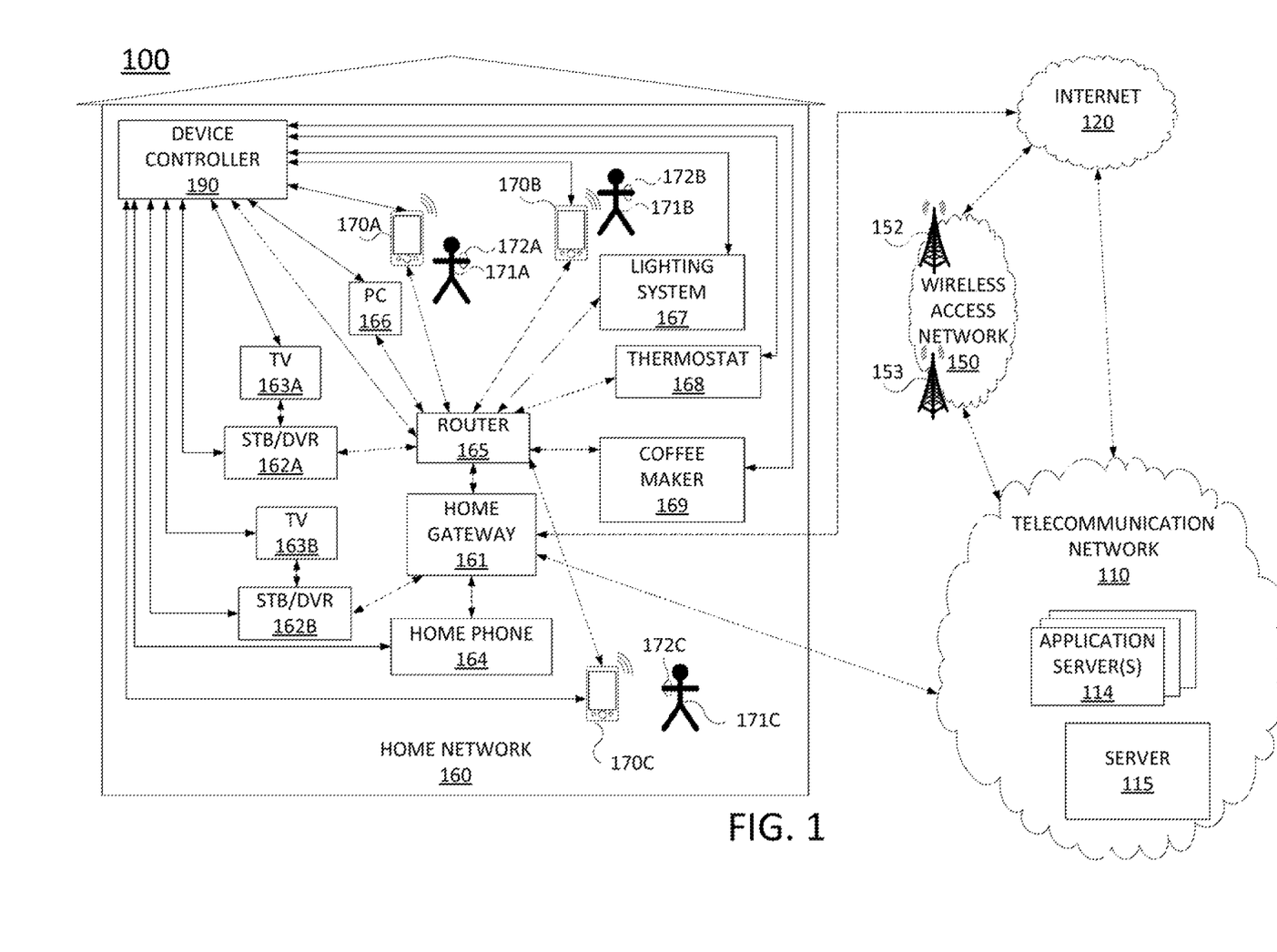
FIG. 1 illustrates an example network or system related to the present disclosure.

To aid in understanding the present disclosure, FIG. 1 illustrates an example system 100, related to the present disclosure. As shown in FIG. 1, the system 100 connects mobile devices 170A-170C, and home network devices such as home gateway 161, set-top boxes (STBs) 162A, and 162B, television (TV) 163A and TV 163B, home phone 164, router 165, personal computer (PC) 166, lighting system 167, thermostat 168, coffee maker 169, and so forth, with one another and with various other devices via a telecommunication network 110, a wireless access network 150 (e.g., a cellular network), and Internet 120.

In one embodiment, each of mobile devices 170A-170C may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one embodiment, any one or more of mobile devices 170A-170C may have both cellular and non-cellular access capabilities and may further have wired communication and networking capabilities. In one example, mobile devices 170A-170C may be used by users 171A-171C, who may be associated with one another as family members, e.g., parents and children, as friends, as co-workers, as caregiver and charge(s), and so forth. In one example, each of the users 171A-171C may further have at least one respective biometric sensor 172A-172C, e.g., a wearable device, that may be in communication with one of the mobile devices 170A-170C, e.g., via a wired or a wireless connection, such as a via an infrared transmitter or transceiver, a transceiver for Institute for Electrical and Electronics Engineers (IEEE) 802.11 based communications (e.g., "Wi-Fi"), IEEE 802.15 based communications (e.g., "Bluetooth", "ZigBee", etc.), and so forth. Alternatively, or in addition, any one or more of biometric sensors 172A-172C may connect to various networks independently of a respective mobile device. The biometric sensors 172A-172C may include: heart rate monitors, electrocardiogram devices, acoustic sensors, sensors for measuring users' breathing rates, galvanic skin response (GSR) devices, and so forth.

In one example, the biometric sensors 172A-172C may measure or capture data regarding various physical parameters of a user (broadly, "biometric data") from which a mood, e.g., a mental or emotional state, may be calculated. For instance, the biometric sensors 172A-172C may record users' heart rates, breathing rates, skin conductance and/or sweat/skin moisture levels, temperature, blood pressure, voice pitch and tone, body movements, e.g., eye movements, hand movements, and so forth. In another example, the biometric sensors 172A-172C may measure brain activity, e.g., electrical activity, optical activity, chemical activity, etc., depending upon the type of biometric sensor.

As illustrated in FIG. 1, users 171A-171C appear to have one biometric sensor apiece. However, it should be understood that users 171A-171C may each have any number of different biometric sensors. In one example, data gathered by biometric sensors 172A-172C may be used to calculate or determine the users' moods. In addition, relevant biometric data for users 171A-171C may also be gathered from other devices, such as PC 166, TV 163A, TV 163B, mobile devices 170A-170C, and so forth, as described in greater detail below. For example, the TVs 163A may have an attached or integrated camera for obtaining facial image data of a viewer, and/or an attached or integrated microphone for recording voice(s) within recording range of the microphone. PC 166, TV 163B, and mobile devices 170A-170C may be similarly equipped. Thus, in one example, PC 166, TV 163A, TV 163B, or one of mobile devices 170A-170C may capture video or still images of users' faces. Similarly, PC 166, TV 163A, TV 163B, or one of mobile devices 170A-170C may record audio data of users' voices from which pitch, tone, and other parameters may be calculated. Alternatively, or in addition, words and phrases in the audio data may also be determined, e.g., using speech recognition techniques. In another example, PC 166, TV 163A, TV 163B, or one of mobile devices 170A-170C may measure postures of users 171A-171C from captured images and/or video. For instance, a slouching posture may be associated with depression or sadness, while sitting or standing straight is more correlated with happiness or contentment. In still another example, a keyboard of PC 166 may record forces of keystrokes, mobile devices 170A-170C may record forces of presses on touchscreens of the respective devices, and so forth.

In one example, telecommunication network 110 may combine core network components of a cellular network with components of a triple play service network; where triple-play services include telephone services, Internet services, and television services to subscribers. For example, telecommunication network 110 may functionally comprise a fixed mobile convergence (FMC) network, e.g., an IP Multimedia Subsystem (IMS) network. In addition, telecommunication network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication network 110 may also further comprise a broadcast television network, e.g., a traditional cable provider network or an Internet Protocol Television (IPTV) network, as well as an Internet Service Provider (ISP) network. For example, with respect to television service provider functions, application servers 114 may represent one or more television servers for the delivery of television content, e.g., a broadcast server, a cable head-end, and so forth. For instance, telecommunication network 110 may comprise a video super hub office, a video hub office and/or a service office/central office. With respect to cellular core network functions, application servers 114 may represent a Home Subscriber Server/Home Location Register (HSS/HLR) for tracking cellular subscriber device location and other functions, a serving gateway (SGW), a packet data network gateway (PGW or PDN GW), a mobility management entity (MME), and so forth. Application servers 114 may further represent an IMS media server (MS) for handling and terminating media streams to provide services such as announcements, bridges, and Interactive Voice Response (IVR) messages for VoIP and cellular service applications.

Figure 3:
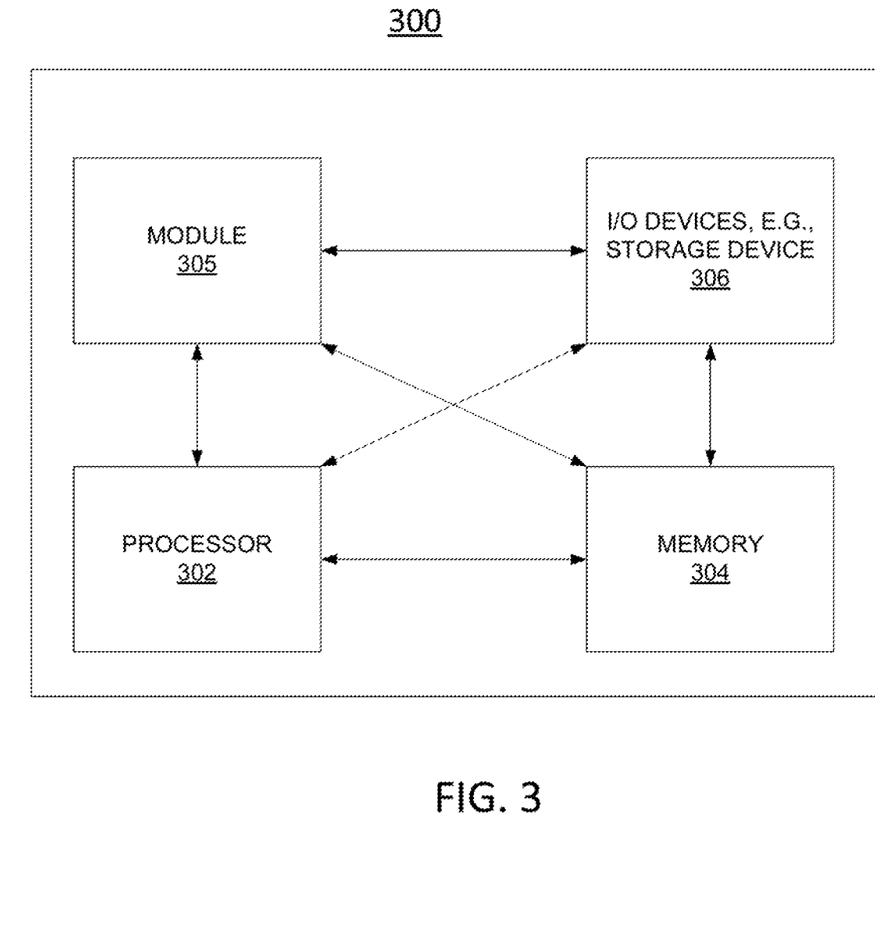
FIG. 3 illustrates an example high-level block diagram of a computer specifically programmed to perform the steps, functions, blocks, and/or operations described herein.

As shown in FIG. 1, telecommunication network 110 may also include a server 115. In one example, the server 115 may comprise a computing system, such as computing system 300 depicted in FIG. 3, and may be configured to provide one or more functions for applying a setting to a network-connected device in accordance with preferences and tolerance ranges of at least two users, as described herein. For example, server 115 may be configured to perform one or more steps, functions, or operations in connection with the example method 200 described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure. For ease of illustration, various additional elements of telecommunication network 110 are omitted from FIG. 1.

In one example, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE), "fifth generation" (5G), or any other yet to be developed future wireless/cellular network technology. While the present disclosure is not limited to any particular type of wireless access network, in the illustrative embodiment, wireless access network 150 is shown as a UMTS terrestrial radio access network (UTRAN) subsystem. Thus, base stations 152 and 153 may each comprise a Node B or evolved Node B (eNodeB). As illustrated in FIG. 1, mobile devices 170A-170C may be in communication with one or both of base stations 152 and 153, which provide connectivity between the mobile devices 170A-170C and other endpoint devices within the system 100, various network-based devices, such as server 115, application servers 114, and so forth. In addition, in one example biometric sensors 172A-172C may also be in communication with one or both of base stations 152 and 153, e.g., where biometric sensors 172A-172C are also equipped for cellular communication. In one example, wireless access network 150 may be operated by the same or a different service provider that is operating telecommunication network 110.

In one example, home network 160 may include a home gateway 161, which receives data/communications associated with different types of media, e.g., television, phone, and Internet, and separates these communications for the appropriate devices. In one example, television data is forwarded to set-top boxes (STBs)/digital video recorders (DVRs) 162A and 162B to be decoded, recorded, and/or forwarded to television (TV) 163A and TV 163B for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 170A-170C, lighting system 167, thermostat 168, coffee maker 169, and so forth. In one example, router 165 may further communicate with TV (broadly a display) 163A and/or 163B, e.g., where one or both of the televisions is a smart TV. In one example, router 165 may comprise a wired Ethernet router and/or an IEEE 802.11 (Wi-Fi) router, and may communicate with respective devices in home network 160 via wired and/or wireless connections. In this regard, it should be noted that lighting system 167, thermostat 168, and coffee maker 169 may comprise "smart" appliances (e.g., network-connected devices/Internet of Things (IoT) devices), with wired and/or wireless networking/communication capability. Thus, such appliances may be remotely programmed or configured, and may communicate operational data to remote devices via one or more networks or network links. Similarly, TVs 163A and 163B, STBs/DVRs 162A and 162B, and/or home phone 164 may also comprise smart appliances with wired and/or wireless networking/communication capability, which may be remotely programmed or configured, and which may communicate operational data to remote devices via one or more networks or network links. For instance, each of these devices may include a transceiver for IEEE 802.11-based communications, for IEEE 802.15-based communications, for wired communications, e.g., for wired Ethernet, and so forth. In this regard, it should be noted that in one example, STBs/DVRs 162A and 162B may also represent streaming media players.

In one example, home network 160 may also include a device controller 190. In one example, the device controller 190 may comprise a computing system, such as computing system 300 depicted in FIG. 3, and may be configured to provide one or more functions for applying a setting to a network-connected device in accordance with preferences and tolerance ranges of at least two users. For example, device controller 190 may be configured to perform one or more steps, functions, or operations in connection with the example method 200 described below. As illustrated in FIG. 1, device controller 190 may be in communication with various network-connected devices/appliances within home network 160. In this regard, device controller 190 may also include a transceiver for IEEE 802.11-based communications, for IEEE 802.15-based communications, for wired communications, e.g., for wired Ethernet, and so forth. It should be noted that as described herein, functions of device controller 190 may similarly be performed by server 115 in telecommunication network 110. However, for illustrative purposes, examples are described primarily in connection with device controller 190.

For instance, device controller 190 may detect the presence of at least two users (e.g., any two or more of users 170A-170C) in a zone (e.g., in a room of a home of home network 160) containing at least one network-connected device (e.g., at least one of: lighting system 167, thermostat 168, coffee maker 169, TVs 163A and 163B, STBs/DVRs 162A and 162B, or home phone 164), and obtain preferences and tolerance ranges of the at least two users with respect to the at least one network-connected device. In one example, the preferences and tolerance ranges may be obtained from the mobile devices 170A-170C. For instance, the mobile devices 170A-170C may broadcast the preferences and tolerance ranges of users 171A-171C respectively, e.g., via IEEE 802.11-based broadcast, for IEEE 802.15-based broadcast, or the like, which may be received by device controller 190. In another example, a network-based processing system, e.g., server 115 may store and/or transmit the preferences and tolerance ranges of users 171A-171C. For instance, device controller 190 may detect the presence of two or more of users 171A-171C, e.g., by detecting mobile devices 170A-170C and/or biometric sensors 172A-172C, and may then request the preferences and tolerance ranges from server 115. In still another example, device controller 190 may track "regular" users who may often be present at/in the home network 160 and may sync users profiles (e.g., preferences and tolerance ranges of the users 171A-171C with respect to various "states") with server 115.

In one example, device controller 190 may then select at least one setting for the at least one network-connected device in accordance with the preferences and tolerance ranges of the at least two users. For example, device controller 190 may apply at least one weighting of the preferences and tolerance ranges of the at least two users to determine the at least one setting, and apply the at least one setting to the at least one network-connected device. The weighting may, for example, give greater weight to preference(s) and/or tolerance range(s) of user(s) who have narrower tolerance ranges (those who are more picky), and lesser weight to the preference(s) and/or tolerance range(s) of users who may have wider tolerance ranges (those who are less picky). In one example, the weightings may also be in accordance with users' respective relationships or statuses. For instance, greater weighting may be given to the preference(s) and/or tolerance range(s) of user 171A, who may be a parent, compared to the preference(s) and/or tolerance range(s) of user 171B, who may be a child. In another example, greater weightings may be given to a premises owner and/or owner of a network-connected device compared to a guest. Conversely, a premises owner/host may configure device controller 190 to give greater weight to guests' preferences (and tolerance ranges).

The device controller 190 may further detect a change of the at least one setting. For instance, one of the users 171A-171C may be uncomfortable with a current setting of one of the network-connected devices and may manually change the setting, such as raising or lowering the temperature via the thermostat 168, raising or lowering (or turning on or off) the lights via lighting system 167, adjusting the volume of one of TVs 163A or 163B, and so on. In response to detecting the change of the setting, the device controller 190 may adjust at least one of the preferences and tolerance ranges of the at least two users in response to the change of the setting. For instance, the action may be considered indicative that the user making the change is uncomfortable with the setting, and therefore that the setting is not within the tolerance range of the user. In addition, the new setting selected by the user may also be considered indicative of the user's preference and/or tolerance range. For instance, the setting selected by the user may indicate the user's preferred setting for the network-connected device with respect to other parameters of the current "state." However, the setting selected may not actually be the user's preference, but may be a compromise with one or more of the other users 171A-171C. As such, in one example, the new setting may be considered to be within the tolerance range of the user making the change, but not necessarily the user's actual preference for the setting. In addition, the new setting may also be considered to be within the tolerance ranges of any of the other users present in the group. As such, the tolerance ranges of the respective users 171A-171C who are present may all be adjusted according.

As mentioned above, the present disclosure may also include the learning and maintenance of group preferences and tolerance ranges (e.g., group profiles). For instance, in the present example, device controller 190 may initially establish a group profile including device settings of one or more network-connected devices of home network 160 selected based upon an average, or a weighted average of the preferences and/or tolerance ranges of the users 171A-171C present in the group. This initial establishment of the group profile may occur the first time this particular group of users is detected to be co-located.

In one example, the device controller 190 may determine that any two or more of users 171A-171C are co-located based upon Global Positioning System (GPS) location information which may be gathered by GPS units within mobile devices 170A-170C and reported to device controller 190 via one or more networks. In one example, the device controller 190 may determine that any two or more of users 171A-171C are co-located based upon a local network discovery function whereby device controller 190 may determine that any two or more of mobile devices 170A-170C are connected to home network 160. In still another example, device controller 190 may determine the locations of users 171A-171C based upon serving base station information, e.g., depending upon whether mobile devices 170A-170C are respectively assigned to base station 152 or base station 153, and so forth. In one example, location information for various mobile devices 171A-171C may be gathered by one of application severs 114 in telecommunication network 110 and forwarded to device controller 190.

Thereafter, the group profile may be updated as the users' behavior is observed over time with respect to different device settings for different "states." For example, user 171C may be a guest of users 171A and 171B. The user 171C may typically keep his or her own home at a temperature of 75 degrees. For instance, the user 171C may prefer to wear shorts and a short-sleeve shirt at home, even in the winter. However, as a guest of others and in the wintertime, user 171C may always or typically wear a sweater or other warm clothes. Thus, relying upon the individual profile of user 171C to initially create the group profile, the device controller 190 may skew the group preference and/or tolerance range towards a higher temperature. For instance, the device controller 190 may initially select a temperature of 72 degrees as a group preference, and may set the thermostat to 72 degrees. However, in actuality, this may be too high for user 171C who may be wearing warmer clothing than at his or her own home. In addition, user 171A or user 171B may manually lower the temperature to 68 degrees to accommodate the group. For instance, the hosts may ask the guest 171C if he or she is comfortable, and the answer may be that it is too hot. As such, one of the hosts (user 171A or user 171B) may manually lower the temperature, and 68 degrees may be noted as the group preference for a temperature setting.

In addition to adjusting preferences and tolerance ranges in response to users manually adjusting various device settings, in one example, device controller 190 may also detect users' moods through biometric information and adjust the preferences and tolerance ranges of individual users and/or the group preferences and tolerance ranges in response to the moods that are detected. For instance, the device controller 190 may gather biometric data from mobile devices 170A-170C and/or biometric sensors 172A-172C via home network 160, wireless access network 150, Internet 120, telecommunication network 110, etc. In one example, the device controller 190 may also gather biometric data from devices/appliances within the home network 160. For instance, PC 166, TV 162A, and/or TV 162B may include a camera which may capture video and/or images of users' faces, gestures, etc. PC 166, TV 162A, and/or TV 162B may further include a microphone which may capture audio of users' voices, including tone, pitch, specific words and phrases that are spoken, and so forth.

In one example, the device controller 190 may gather biometric data for each of the users 170A-170C, and may quantify a respective mood for each of the users 170A-170C based upon the biometric data. In one example, moods may include positive moods/mental states such as, happy, excited, relaxed, content, calm, cheerful, optimistic, pleased, blissful, amused, refreshed, or satisfied; negative moods such as sad, angry, upset, devastated, mad, hurt, sulking, depressed, annoyed, or enraged; and neutral moods such as indifferent, bored, sleepy, and so on. These moods are only examples and are not to be interpreted as limitations of the present disclosure. In one example, different moods may have different signatures or profiles to which biometric data that is gathered from various biometric sensors, e.g., biometric sensors 172A-172C, or to which data derived from the biometric data may be compared in order to determine a most likely current mood for each of the respective users 171A-171C. The signatures may be based upon various types of biometric data, e.g., depending upon the types of the biometric sensors 172A-172C that are in use and the types of biometric data that the biometric sensors 172A-172C collect, depending upon the types of additional devices that collect biometric data, e.g., PC 166, etc., the nature of the biometric data that such devices gather, and so forth.

For example, if the biometric data for user 171A includes facial image data gathered from mobile device 170A, the device controller 190 may calculate the mental state of user 171A, at least in part, using pattern matching, e.g., to eigenfaces of user 171A based upon a training data set, or composite eigenfaces representative of various mental states/moods over a training data set from faces of various users and for different mental states/moods. In another example, device controller 190 may calculate a mood of user 171C from audio data gather via biometric sensor 172C, mobile device 170C, and/or other devices in system 100. For instance, the audio data may be compared to various signatures or profiles for different moods, and a best matching mood may be calculated as the current mood for the user 171C. In one example, the calculating may include comparing the words and/or phrases recorded to various profiles or signatures for different moods, e.g., where the profiles/signatures may comprise dictionaries or word lists that include words and/or phrases that are representative of the respective moods.

In still another example, biometric data gathered by device controller 190 from biometric sensor 172C for user 171C may include heart rate and/or breathing data. Thus, in one example, the mood of the user 171C may be determined based, at least in part, upon the heart rate or breathing rate data. For instance, an elevated heart rate or breathing rate, e.g., as compared to a baseline/resting rate for the user 171C, may be indicative of duress, fear, etc. It should be noted that different types of biometric data may be aggregated and matched to signatures/patterns for different moods that are comprised of multiple data points that account for the different types of biometric data. In one example, a user's mood/mental state may be broadly classified as being a positive mood or a negative mood by quantifying the mental state/mood within a two or three dimensional space, e.g., according to an evaluative space model, a circumplex model, a vector model, a Positive Activation-Negative Activation (PANA) model, a Profile of Mood States (POMS), or the like.

In any case, the device controller 190 may quantify a user's mood as being "positive," "negative," or "neutral" or may grade the users mood on a numerical scale, e.g., 0 to 1, 0 to 100, −100 to +100, etc.). Device controller 190 may then determine that certain preferences and/or tolerance ranges for one or more users and/or for a group, should be adjusted in response to certain (quantified) moods (e.g., negative moods, moods scored below a 30th percentile on a scale of moods, etc.). For instance, a user observed to change from a positive mood to a negative mood for a particular device setting and with respect to a given "state" may have the user's tolerance range adjusted up or down (e.g., depending upon whether the current setting is above or below what the device controller 190 previously determined to be the user's preference for the device setting). In one example, the device controller 190 may observe users moods over many different device settings and "states" and may use a regression analysis to identify correlations between device settings (predictors/independent variable) and the users' moods (response/dependent variable) (e.g., over 6 months of historical data, a year of historical data, etc.), and adjust preferences and tolerance ranges in response to mood data over such longer time periods. For instance, device settings associated with negative moods may result in changes to preferences and/or tolerance ranges of one or more users and/or a group, while device settings associated with positive moods may result in "strengthening" or increased confidence of preferences and/or tolerance ranges. For example, the device controller 190 may then require more negative examples to be observed to result in a change to the preferences and/or tolerance ranges.

It should be further noted that in one example, user profiles (e.g., preferences and tolerance ranges) and group profiles (e.g., preferences and/or tolerance ranges) may also be stored in a hierarchical temporal memory (HTM). In such case, preferences and tolerance ranges for new states which have not previously been observed may still be inferred from the structure of the HTM. For instance, the "state" for a group of users 171A-171C meeting at a home of home network 160 for "game night" on a Saturday may be very similar to a "state" for the same group of users meeting at a different home for "game night" on a Saturday with a similar set of appliances/network-connected devices. For instance, the only input parameter which may change is the "location." Thus, the output of the HTM may be very similar for this new state as compared to a previously observed state for the group of users 171A-171C. However, it is entirely possible that the preferences and/or tolerance ranges for this particular group (e.g., for one or more device settings) at the other home may be entirely different. A device controller at this different home may detect this difference by observing the users' behaviors in response to the predicted setting(s), which may be stored/encoded in the HTM structure such that the next time this particular state is encountered, the HTM structure will remember the different preference(s) and/or tolerance range(s) that is/are specific to the "state," and apply it to the network-connected device(s) accordingly. For instance, the device controller at the different location may notify the server 115 of the different preference(s) and/or tolerance range(s), and the server 115 may update the HTM (e.g., one or more user profiles, the group profile, or both) based upon the detected change(s).

In one example, homes/buildings have different inherent uncontrollable factors like drafts, more or less shade, variances in sensors, accuracy of output of network-connected devices, and so forth. Thus, the concept of a "state" may flexibly account for such differences. For instance, a user may prefer to set his or her home thermostat to 68 degrees. However, the heating/cooling system may be faulty or inaccurate and the actual temperature in the home may be 72 degrees when the thermostat setting is at 68 degrees. When the user is in another location, such as in the user's office, a device controller responsible for that location could initially infer that the user prefers 68 degrees, but may learn over time that the user actually prefers a thermostat setting of 72 degrees, and may have a tolerance range of 69-73 degrees, for example) by observing the user alone or in one or more groups regarding a different state (or states). For purposes of this example, it may be assumed that the thermostat at the office is accurate. However, it is noted that this is not necessary since the matching of preferences and tolerance ranges to different states may result in the learning of the user model/profile to include a preference for the work thermostat to be 72 degrees (regardless of the actual corresponding temperature in the location). In other words, the user profile may store the same type of parameter for each location as a separate variable. Since calibration of controllers vary, and each zone/location may experience unpredictable influx of external factors (e.g. drafts, open windows, etc.) the learned settings such as levels, temperature, and others, are not treated as a universal value across all controlled zones/location but are indexed on a particular location only.

In addition, it should be understood that the system 100 may be implemented in a different form than that which is illustrated in FIG. 1, or may be expanded by including additional endpoint devices, access networks, network elements, application servers, etc. without altering the scope of the present disclosure. For example, telecommunication network 110 is not limited to an IMS network, wireless access network 150 is not limited to a UMTS/UTRAN configuration, and so forth. Similarly, the present disclosure is not limited to an IP/MPLS network for VoIP telephony services, or any particular type of broadcast television network for providing television services. Various other configurations in accordance with the present disclosure are therefore possible. For instance, operations for applying a setting to a network-connected device in accordance with preferences and tolerance ranges of at least two users may be implemented in PC 166 instead of having a separate device controller 190, the home network 160 may include additional network-connected (e.g., IoT) devices, such as a stereo, a gaming system, wireless headphones, a humidistat, a fan, a window, curtains or blinds, a fireplace (e.g., an electric fireplace), an automated scent generator, and so forth. In still another example, any functions described with respect to device controller 190 may be performed by server 115 in telecommunication network 110. In such case, devices in home network 160 may be configured to accept instructions from server 115, which resides outside home network 160. In one example, device controller 190 may receive instructions from server 115, and may distribute such instructions to appropriate devices within the home network 160. In such an example, the operator of telecommunication network 110 may therefore provide a service for controlling network-connected devices in accordance with group preferences via the operator infrastructure in conjunction with devices deployed at one or more customer locations, such as home network 160. In this regard, it should be noted that automated actions may also be implemented with respect to devices deployed in various other networks. For instance, users 171A-171C may comprise a family with a vacation home having a different local area network from home network 160. In this case, automated actions may be implemented via both devices in home network 160 and devices located at the vacation home, depending upon where the users 171A-171C are presently located. In addition, aspects of the system 100 described above may equally apply to groups of other users having different relationships, such as guests in the home of home network 160, and groups of users in other locations, such as other homes, offices, schools, or other public places, and so on. Thus, these and other modifications are all contemplated within the scope of the present disclosure.

Figure 2:
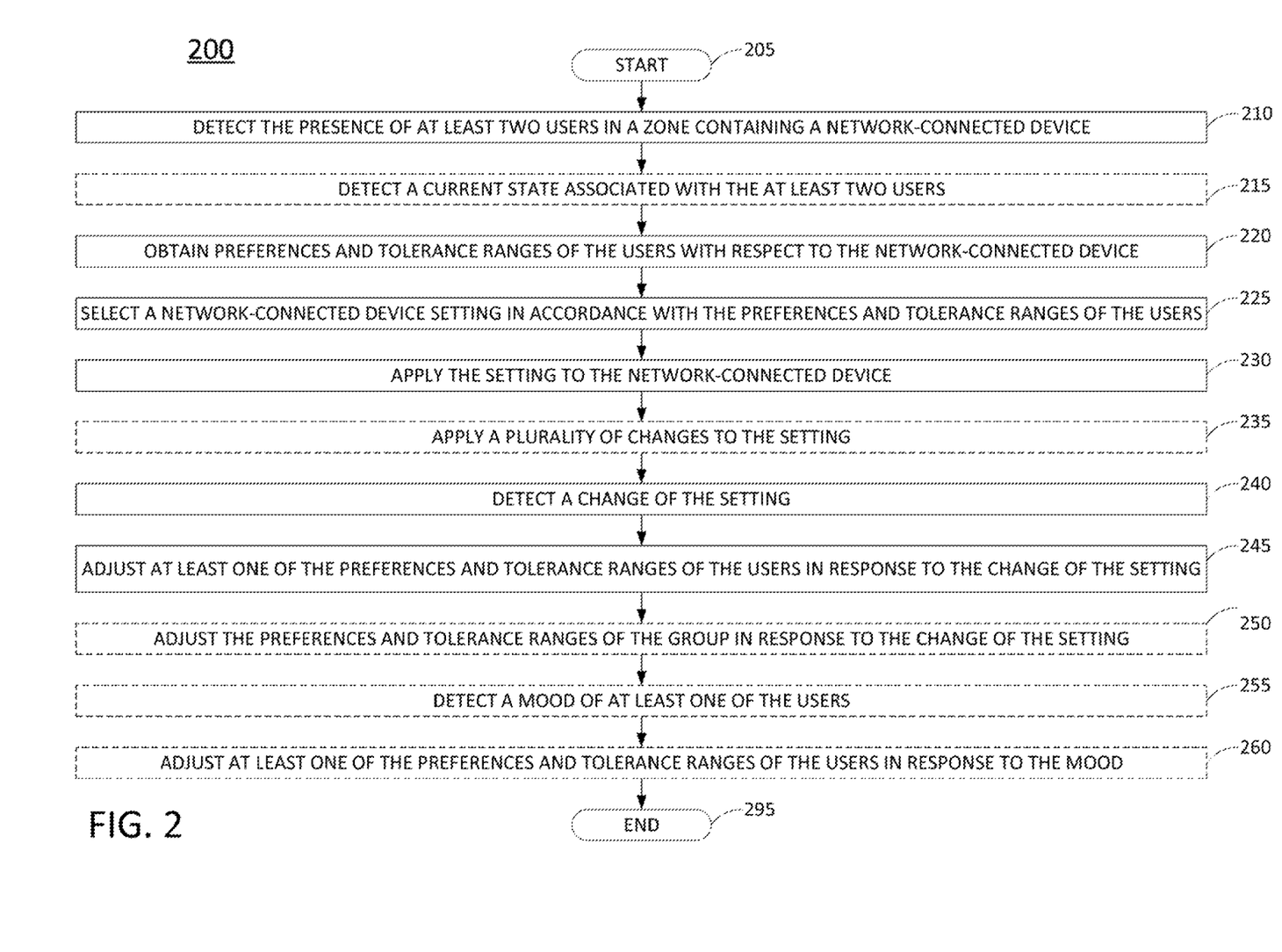
FIG. 2 illustrates a flowchart of an example method for applying a setting to a network-connected device in accordance with preferences and tolerance ranges of at least two users.

FIG. 2 illustrates a flowchart of an example method 200 for applying a setting to a network-connected device in accordance with preferences and tolerance ranges of at least two users. In one example, the method 200 is performed by one or more components of the system 100 of FIG. 1, such as by device controller 190 and/or server 115 in FIG. 1, and/or any one or more components thereof (e.g., a processor, or processors, performing operations stored in and loaded from a memory), or by device controller 190 and/or server 115 in conjunction with one or more other devices, such as mobile devices 170A-170C, and home network devices such as home gateway 161, set-top boxes (STBs) 162A, and 162B, television (TV) 163A and TV 163B, home phone 164, router 165, personal computer (PC) 166, lighting system 167, thermostat 168, coffee maker 169, and so forth. In one example, the steps, functions, or operations of method 200 may be performed by a computing device or system 300, and/or processor 302 as described in connection with FIG. 3 below. For instance, the computing device or system 300 may represent any one or more components of device controller 190, server 115, etc. in FIG. 1 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system. For illustrative purposes, the method 200 is described in greater detail below in connection with an example performed by a processing system.

The method 200 begins at step 205 and proceeds to step 210.

In step 210, the processing system detects the presence of at least two users in a zone containing a network-connected device. The presence of the users may be detected in various way such as IEEE 802.11 or 802.15 broadcast messages, detection of RFID tags associated with the users, GPS location information of the users' mobile devices obtained by the processing system from a telecommunication network service provider, and so forth.

In optional step 215, the processing system may detect a current state associated with the at least two users. The state may comprise one or more of: a location, a type of activity, a time of day, a day of a week, a month, or a season. A location may be a "zone," or the zone could be part of the location (e.g., a room in a house). The location may also be a type of location, e.g., a home, an office, a gym, a restaurant, etc. In one example, the state may further include a set of available devices and/or a setting of at least a second network-connected device. For example, a setting of another network-connected device could be manually set by one of the users and be taken as a fixed parameter. For instance, if a user manually opens a window, this may impact the same and/or other users' preferences and/or tolerance ranges regarding a thermostat setting, e.g., a heating and/or a cooling system setting.

In step 220, the processing system obtains preferences and tolerance ranges of the at least two users with respect to the network-connected device. In one example, the preferences and tolerance ranges of the at least two users are stored in a hierarchical temporal memory (HTM). In one example, the preferences and tolerance ranges of the at least two users that are obtained are preferences and tolerance ranges regarding the state that is detected at optional step 215. For instance, users may have entirely different preferences and tolerance ranges for how to set a network-connected device depending upon other parameters comprising a "state." For example, during the winter, a user's preference and tolerance range for a thermostat setting may be entirely different from the same user's preference and tolerance range for the thermostat during the summer. Similarly, a user may have different preferences for lighting, heating/cooling, door locks, window shades, etc. for overnight hours versus daytime hours, and so forth.

In step 225, the processing system selects a setting for the network-connected device in accordance with the preferences and tolerance ranges of the at least two users. In one example, the selecting comprises applying at least one weighting of the preferences and tolerance ranges of the at least two users. For instance, the setting for the network-connected device may be selected in accordance with preferences and tolerance ranges of a group comprising the at least two users, where the preferences and tolerance ranges of the group may initially be determined from an averaging of the preferences and tolerance ranges of the at least two users (e.g., a weighted average). Alternatively, or in addition, the preferences and tolerance ranges of the group may initially be determined from an application of one or more machine learning models to the preferences and tolerance ranges of the at least two users. In one example, the "average," or mean, could be centroid for multidimensional settings or for multiple settings simultaneously. For instance, a user may prefer window open and air conditioner off, but if a window is closed, then the user may want the air conditioner on. Similarly, a user may prefer natural light, but if window shades are closed, the user may prefers a lighting system to be turned on and have a light level close to natural light. In one example, the averaging comprises a weighted averaging which favors a preference and a tolerance range of a user with a narrower tolerance range over a preference and a tolerance range of a user with a broader tolerance range.

In one example, the preferences and tolerance ranges of the group may be stored (encoded) in a hierarchical temporal memory (HTM). For instance, both the preferences and tolerance ranges of the at least two users and the preferences and tolerance ranges of the group may be stored (encoded) in a same HTM. In one example, the group profile (e.g., the preferences and tolerance ranges of the group) may be learned and refined over time. In particular, the processing system may learn the group's preferences and tolerance ranges, which may be different than the average or weighted average of the individual preferences and tolerance ranges. In one example, the selecting the setting for the network-connected device may also be in accordance with a designated safe range. For example, the processing system may be configured with protections to not adjust a sauna to be dangerously hot, even if some users have become accustomed to range that is unsafe for others. The network-connected device may comprise, for example, a thermostat, a lighting system, a door, a window, or a window-shade, an air purifier, a humidifier and/or humidistat, and so forth. In one example, the network-connected device may comprise an entertainment system, such as a TV, a set top box, a DVR, a DVD player, a display screen, a desktop computer, a laptop computer, a loudspeaker, an audio mixer, a stereo receiver, etc.

In step 230, the processing system applies the setting to the network-connected device. For example, the setting selected at step 225 and applied at step 230 may include a screen brightness setting, a screen contrast setting, screen color settings, an aspect ratio, a refresh rate, a color temperature setting, a frame interpolation setting, a volume setting, an audio mixer profile/setting, a default channel, a default station, a temperature setting, a humidity setting, a lighting level setting, a setting for a door, window, window shade, and so forth. The setting may also comprise an on/off setting. For example, it may be learned over time that a particular group of users and/or a particular activity may typically involve the entertainment system being on (movie night), or off (board game night). Thus, the television may be automatically turned off for board game night. Similarly, an audio system may be tuned to a channel/station, or a playlist or a type of music may be activated. Alternatively, or in addition, the volume may be set for the group of users in accordance with the average(s)/weighted average(s) and/or the group's learned preference(s) and tolerance ranges for volume, type of music, etc. The lighting level in a room may be similarly controlled (e.g., dimmed or turned off for movie night, in accordance with the preferences and tolerance ranges of the users in the group and/or the learned group preferences and/or tolerance ranges, or turned up to the appropriate level for game night in accordance with the average of the users' preferences and tolerance ranges and/or in accordance with learned group preferences and/or tolerance ranges). It should also be noted that steps 220-230 may include simultaneously configuring multiple devices settings (e.g., diming lights and adjusting temperature for movie watching).

In optional step 235, the processing system may apply a plurality of changes to the setting. For example, the processing system may start with an average/weighted average, but can then test and probe the group by adjusting the setting to find the group limit(s) (e.g., in accordance with the following step 240 and/or optional steps 255 and 260).

In step 240, the processing system detects a change of the setting. The change in the setting may be detected by the network-connected device reporting to the processing system that a manual adjustment of the setting has occurred. For instance, a "smart" window may transmit a notification to the processing system that it has been open or shut, a thermostat may transmit a notification that a temperature setting has been adjusted up or down (and/or the particular temperature/setting that has been selected) or that the heating/cooling system has been turned on or off, and so on.

In step 245, the processing system adjusts at least one of the preferences and tolerance ranges of the at least two users in response to the change of the setting. For example, the change in the setting may indicate that the setting applied at step 230 (and/or any of the settings applied at step 255) is not a preference and is not in a tolerance range of the user making the change. The change in the setting may also indicate a tolerance range of the user(s) not directly making the change of the setting. For instance, if a user has no objection to the change, the new device setting may be within the user(s) respective tolerance range(s).

In optional step 250, the processing system may adjust the preferences and tolerance ranges of the group (e.g., the preference and/or the tolerance range associated with the network-connected device) in response to the change of the setting. For instance, the change in the setting can result in reinforcement learning regarding the profiles of one or more of the at least two users as well as the group profile.

In optional step 255, the processing system may detect a mood of at least one of the at least two users. Notably, users manually adjusting settings, or not objecting to changes in settings, may be indicative of users' (and groups') preferences and tolerance ranges. However, biometric (e.g., mood) reactions may also indicate whether a user accepts one or more current network-connected device settings or is uncomfortable with such settings. For example, a user's mood may be detected from one or more types of biometric data, e.g., heart rate data, facial imagery data, etc., from one or more sources, such as a wearable device, one or more cameras of the user(s) mobile device(s), and so forth. For instance, a user's mood/mental state may be broadly classified as being a positive mental state or a negative mental state by quantifying the mental state/mood within a two or three dimensional space, e.g., according to an evaluative space model, a circumplex model, a vector model, a PANA model, a POMS model, or the like. Alternatively, or in addition, the processing system may quantify a user's mood as being "positive," "negative," or "neutral" or may grade the users mood on a numerical scale, e.g., 0 to 1, 0 to 100, −100 to +100, etc.).

In optional step 260, the processing system may adjust at least one of the preferences and tolerance ranges of the at least two users in response to the mood. For example, the processing system may determine that certain preferences and/or tolerance ranges for one or more users and/or for the group, should be adjusted in response to certain (quantified) moods (e.g., negative moods, moods scored below a $30^{th}$ percentile on a scale of moods, etc.). For instance, a user observed to change from a positive mood to a negative mood for a particular device setting and with respect to a given "state" may have the user's tolerance range adjusted up or down (e.g., depending upon whether the current setting is above or below what the processing determines to be the user's preference for the device setting). In one example, the processing system may observe users' moods over many different device settings and "states" and may use a regression analysis to identify correlations between device setting (s) and the users' moods, and the adjust preferences and tolerance ranges in response to mood data over such longer time periods. In other words, the adjustment of step 260 may comprise the culmination of a plurality of observations which eventually results in the action of adjusting the at least one of the preferences and tolerance ranges of the at least two users (and/or of the group).

Following step 245 or any one of optional steps 250-260 the method 200 proceeds to step 295 where the method 200 ends.

It should be noted that the method 200 may be expanded to include additional steps, or may be modified to replace steps with different steps, to combine steps, to omit steps, to perform steps in a different order, and so forth. For instance, in one example the processing system may repeat one or more steps of the method 200, such as steps 210-245, steps 210-250, steps 240-245, and so forth. For instance, the method 200 may continue to be performed, in whole or in part, on an ongoing basis. In one example, the change in the setting detected at step 240 may also result in changes to settings of other devices. For instance, if the system wrongly infers the activity or the group does something atypical (e.g., turning off the television when it was inferred that it was movie night), this may cause the processing system to change other settings for lights, temperature, etc. For example, this may be considered a new "state" which results in the processing system returning to step 215 to obtain group-optimized settings for the various devices with respect to the new "state." However, in this scenario, the manually adjusted setting of the first device may be accepted as a fixed variable that cannot be further adjusted.

In another example, a state may include user 1 being at home before users 2 and 3 arrive as guests. The processing system may optimize network-connected device settings for the group when the guests arrive. However, certain device settings that were manually set may be honored. For instance, if user 1 adjusted the temperature within the last 5 minutes, last 10 minutes, etc., the processing system may treat this device setting as fixed. Similarly, if user 1 has a television on before users 2 and 3 arrive for game night, the processing system may leave the television on, even if it is anticipated that the type of "activity" is game night and that the television will probably be turned off. Device settings that were automatically set in accordance with user 1's individual preferences and tolerance ranges may be more flexibly changed to better account for the inferred group preferences. Similarly, the processing system may not specifically change a television channel if it is already on. But if the television is off, the processing system may turn it on and tune to a channel in accordance with the groups' preferences.

In still another example, the adjusting the preferences and tolerance ranges of step 245 may be based upon a plurality of observations over a period of time. For instance, a user may be present when another user changes the setting. The new setting could be within the tolerance range of the non-adjusting user when he or she is in such a group, but may not be within an individual tolerance ranges if the user were alone. In one example, the processing system may apply a regression analysis over data collected over a period of time to detect correlations between this particular device setting and/or range of settings and the reactions of the user to differentiate between tolerance ranges when in a group and when alone, for instance. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 3 depicts a high-level block diagram of a computing device or processing system specifically programmed to perform the functions described herein. For example, any one or more components or devices illustrated in FIG. 1 or described in connection with the method 200 may be implemented as the processing system 300. As depicted in FIG. 3, the processing system 300 comprises one or more hardware processor elements 302 (e.g., a microprocessor, a central processing unit (CPU) and the like), a memory 304, (e.g., random access memory (RAM), read only memory (ROM), a disk drive, an optical drive, a magnetic drive, and/or a Universal Serial Bus (USB) drive), a module 305 for applying a setting to a network-connected device in accordance with preferences and tolerance ranges of at least two users, and various input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for applying a setting to a network-connected device in accordance with preferences and tolerance ranges of at least two users (e.g., a software program comprising computer-executable instructions) can be loaded into memory 304 and executed by hardware processor element 302 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for applying a setting to a network-connected device in accordance with preferences and tolerance ranges of at least two users (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
   detecting, by a processor, a presence of at least two users in a zone containing a network-connected device;
   obtaining, by the processor, preferences and tolerance ranges of the at least two users with respect to the network-connected device, wherein the preferences and tolerance ranges of the at least two users are stored in a hierarchical temporal memory;
   selecting, by the processor, a setting for the network-connected device in accordance with the preferences and tolerance ranges of the at least two users and further in accordance with a designated safe range, wherein the designated safe range indicates permissible settings for the network-connected device that are determined to be safe for at least a first user of the at least two users, wherein a preference of at least a second user of the at least two users is outside of the designated safe range, and wherein the selecting includes selecting the setting for the network-connected device from within the designated safe range;
   applying, by the processor, the setting to the network-connected device;
   detecting, by the processor, a change of the setting; and
   adjusting, by the processor, at least one of the preferences and tolerance ranges of the at least two users in response to the change of the setting.

2. The method of claim 1, wherein the setting for the network-connected device is selected in accordance with preferences and tolerance ranges of a group comprising the at least two users, wherein the preferences and tolerance ranges of the group are determined from an averaging of the preferences and tolerance ranges of the at least two users or from an application of one or more machine learning models to the preferences and tolerance ranges of the at least two users.

3. The method of claim 2, wherein the averaging comprises a weighted averaging which favors a preference and a tolerance range of a user of the group with a narrower tolerance range over a preference and a tolerance range of a user of the group with a broader tolerance range.

4. The method of claim 2, further comprising:
   adjusting the preferences and tolerance ranges of the group in response to the change of the setting.

5. The method of claim 2, wherein the preferences and tolerance ranges of the group are stored in the hierarchical temporal memory.

6. The method of claim 1, further comprising:
   detecting a current state associated with the at least two users, wherein the preferences and tolerance ranges of the at least two users that are obtained are preferences and tolerance ranges regarding the current state that is detected.

7. The method of claim 6 wherein the current state comprises one or more of:
   a location;
   a type of activity;
   a time of day;

a day of a week;
a month; or
a season.

8. The method of claim 7, wherein the current state further comprises:
a setting of at least a second network-connected device.

9. The method of claim 1, further comprising:
detecting a mood of at least one of the at least two users; and
adjusting at least one of the preferences and tolerance ranges of the at least two users in response to the mood.

10. The method of claim 9, wherein the mood is determined from biometric data of at least one of the at least two users.

11. The method of claim 1, further comprising:
applying a plurality of changes to the setting, prior to the detecting the change of the setting.

12. The method of claim 1, wherein the network-connected device comprises:
a thermostat; or
a lighting system.

13. The method of claim 1, wherein the network-connected device comprises:
a door;
a window; or
a window-shade.

14. The method of claim 1, wherein the network-connected device comprises an entertainment system.

15. The method of claim 14, wherein the entertainment system comprises at least one of:
a television;
a set top box;
a digital video recorder;
a digital video disc player;
a gaming system;
a desktop computer;
a laptop computer;
a loudspeaker;
a stereo receiver; or
an audio mixer.

16. The method of claim 14, wherein the setting comprises:
a screen brightness setting;
a screen contrast setting;
screen color settings;
an aspect ratio;
a refresh rate;
a color temperature setting;
a frame interpolation setting;
a volume setting; or
an audio mixer profile.

17. A non-transitory computer-readable medium storing instructions which, when executed by a processing system including at least one processor, cause the processing system to perform operations, the operations comprising:
detecting a presence of at least two users in a zone containing a network-connected device;
obtaining preferences and tolerance ranges of the at least two users with respect to the network-connected device, wherein the preferences and tolerance ranges of the at least two users are stored in a hierarchical temporal memory;
selecting a setting for the network-connected device in accordance with the preferences and tolerance ranges of the at least two users and further in accordance with a designated safe range, wherein the designated safe range indicates permissible settings for the network-connected device that are determined to be safe for at least a first user of the at least two users, wherein a preference of at least a second user of the at least two users is outside of the designated safe range, and wherein the selecting includes selecting the setting for the network-connected device from within the designated safe range;
applying the setting to the network-connected device;
detecting a change of the setting; and
adjusting at least one of the preferences and tolerance ranges of the at least two users in response to the change of the setting.

18. A device comprising:
a processing system including at least one processor; and
a non-transitory computer-readable medium storing instructions which, when executed by the processing system, cause the processing system to perform operations, the operations comprising:
detecting a presence of at least two users in a zone containing a network-connected device;
obtaining preferences and tolerance ranges of the at least two users with respect to the network-connected device, wherein the preferences and tolerance ranges of the at least two users are stored in a hierarchical temporal memory;
selecting a setting for the network-connected device in accordance with the preferences and tolerance ranges of the at least two users and further in accordance with a designated safe range, wherein the designated safe range indicates permissible settings for the network-connected device that are determined to be safe for at least a first user of the at least two users, wherein a preference of at least a second user of the at least two users is outside of the designated safe range, and wherein the selecting includes selecting the setting for the network-connected device from within the designated safe range;
applying the setting to the network-connected device;
detecting a change of the setting; and
adjusting at least one of the preferences and tolerance ranges of the at least two users in response to the change of the setting.

19. The non-transitory computer-readable medium of claim 17, wherein the setting for the network-connected device is selected in accordance with preferences and tolerance ranges of a group comprising the at least two users, wherein the preferences and tolerance ranges of the group are determined from an averaging of the preferences and tolerance ranges of the at least two users or from an application of one or more machine learning models to the preferences and tolerance ranges of the at least two users.

20. The non-transitory computer-readable medium of claim 19, wherein the averaging comprises a weighted averaging which favors a preference and a tolerance range of a user of the group with a narrower tolerance range over a preference and a tolerance range of a user of the group with a broader tolerance range.

* * * * *